Sept. 2, 1947. T. H. AFFLECK 2,426,660
FLUID PRESSURE BRAKE FOR VEHICLES
Filed Feb. 21, 1944 2 Sheets-Sheet 1
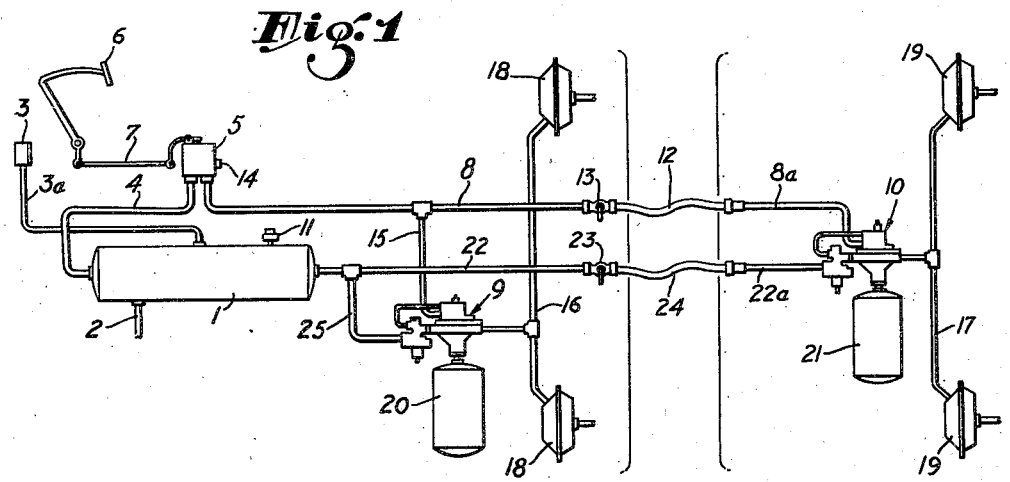
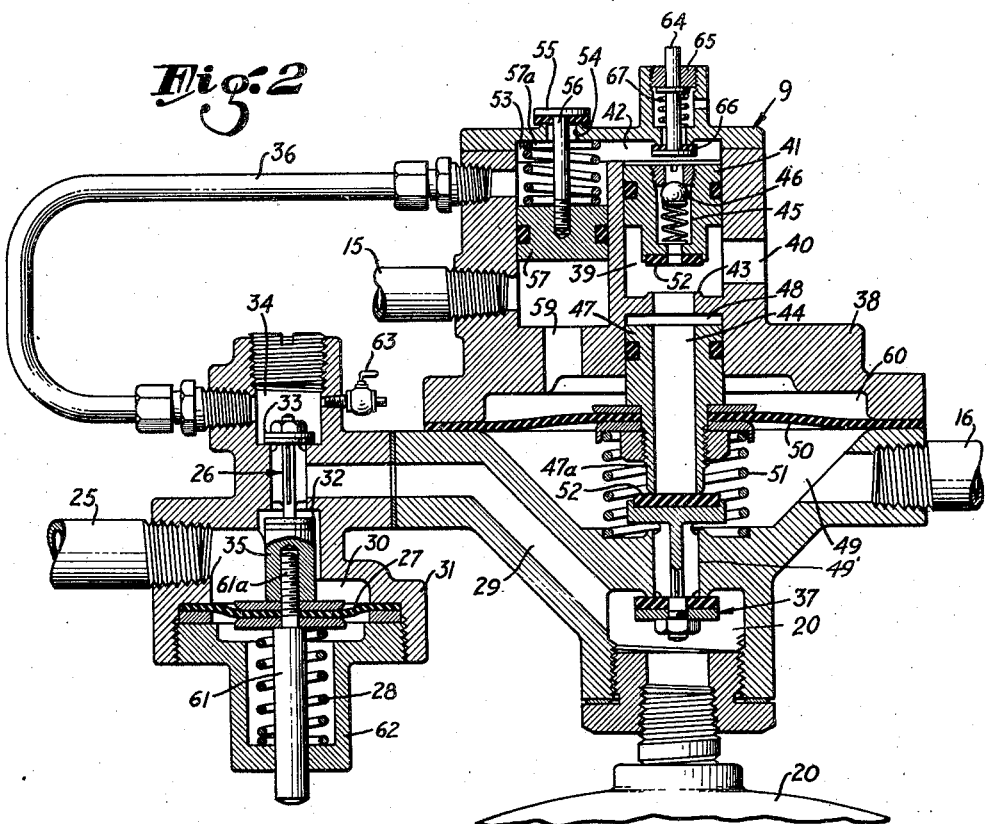
Inventor
THEODORE H. AFFLECK.
By
Attorney Sept. 2, 1947.   T. H. AFFLECK   2,426,660
FLUID PRESSURE BRAKE FOR VEHICLES
Filed Feb. 21, 1944   2 Sheets-Sheet 2

Inventor
THEODORE H. AFFLECK.
By
Attorney

Patented Sept. 2, 1947

2,426,660

UNITED STATES PATENT OFFICE 2,426,660

FLUID PRESSURE BRAKE FOR VEHICLES

Theodore H. Affleck, North Hollywood, Calif., assignor, by mesne assignments, to William A. Cooke, Hollywood, Calif.

Application February 21, 1944, Serial No. 523,210

5 Claims. (Cl. 303—26)

My invention relates to fluid brake apparatus, such as is commonly used on automotive trucks and trailers.

There are on the market today air brake mechanisms for automotive trucks and trailers, in which the brakes are applied through the use of air under pressure. It is customary to provide the vehicles with air reservoirs which are supplied with air by compressors which are connected to the engines of the vehicles and therefore operate only when the vehicle engine is in operation. When a truck is standing for a long period of time, such, for example, as overnight, leakages in the braking system allow the air to escape and the air pressure may be reduced to a point below the minimum pressure for satisfactory brake operation. It is therefore necessary from the safety standpoint to operate the compressor for a period of time to rebuild the air pressure before the vehicle is taken on the road. Drivers are impatient to get started, particularly in the morning, and sometimes they will take their trucks onto the road before the air pressure has been built up to the predetermined minimum. As a result of this, rather serious accidents have occurred because the vehicle would have inadequate or no brakes.

It is an object of my invention to provide brake apparatus in which the brakes are automatically applied when the air pressure in the air system is being built up to its predetermined minimum pressure.

It is another object of my invention to provide brake apparatus in which the compressor in charging the system, supplies air to a main reservoir until such time that a predetermined pressure has been reached, at which time the full main reservoir pressure is applied to the brakes to give a prompt and full pressure brake application. This prevents any danger of "dragging" the brakes, and, consequently, considerable wear upon them will be eliminated. By this arrangement, the vehicle driver will be particularly discouraged from taking his vehicle upon the road until full brake pressure has been attained, because he will know that if he does take his vehicle upon the road before a predetermined pressure has been attained, that the brakes on his vehicle will be fully applied, and will stop him on the road, where he will have to wait until the predetermined minimum air pressure has been attained.

One of the objects of this invention is to provide a brake apparatus of simple structure which will overcome some of the objections inherent in brake systems in common use, and to provide a brake apparatus which will operate in such a way that when the auxiliary or emergency tank or reservoir on the vehicle that supplies the fluid under pressure for applying the brakes is receiving the operating fluid to raise its pressure to the normal working pressure of the system, the operating fluid will be also passed to the brake chambers and effect a testing application of the brakes, thereby indicating to the operator of the vehicle whether the brakes are intact; also, to provide means for enabling a normal application of the brakes thereafter, and after the normal working pressure has been reached, to effect the release of the brakes.

Another object of the invention is to provide a brake apparatus operating in such a way that if at any time in the operation of the vehicle, the pressure of the operating fluid to be used for applying the brakes falls below a predetermined level, the brakes will then be automatically applied, thereby indicating to the operator of the vehicle that the pressure of the operating fluid is below normal. Such a reduced pressure may be due to a leak in the line or some other defect in the brake system.

Many vehicles such as trucks, draw trailers which are provided with a brake system on the trailer and occasionally accidents occur due to the fact that a trailer may break away from the car or truck towing it, and may run away on a grade, or crash at the side of the roadway. One of the objects of this invention is to provide a brake apparatus operating in such a way that a trailer provided with this apparatus will have its brakes automatically applied as soon as the connection to the towing car is broken.

Another object of the invention is to provide a brake apparatus of this type with means insuring that when the brakes are applied, the full pressure of the operating fluid will be applied and passed freely through the ducts to the brake chambers.

In the preferred embodiment of the invention a valve is employed for permitting the flow of the operating fluid from a supply tank to the brake chambers to apply the brakes, and one of the objects of the invention is to provide means for effectng the full opening of a valve in an emergency such as suggested above, so that the full pressure of the operating fluid existing in the tank will be exerted and passed on into the brake chambers. This feature of the invention is most advantageous as compared with some brake systems in which the emergency brake pressure amounts to the difference between the pressure in the trailer tank and that in the truck tank because such reduced pressure will not result in an effective application of the brakes, but will merely bring about an ineffectual application of the brakes.

In most, or all, of the air brake systems now in use, when it is necessary to adjust the brakes on a trailer, a mechanic must crawl under the trailer and signal the driver in the cab of the truck to apply and release the brakes. He must do this in order to inspect the stroke of the push rods which project out of the brake chambers, and, if these push rods project too far, he must adjust the slack adjusters to make the travel shorter. For each brake, several applications of the brakes have to be made by the driver so that the mechanic can check his work; and, usually, a third man is necessary to relay the signals from the mechanic under the trailer to the driver, on account of the noise of the motor and the distance from the cab to the mechanic's position under the trailer. One of the objects of this invention is to overcome this objection and to provide a brake apparatus of this type having simple means enabling a mechanic under the trailer or under the towing vehicle to apply the brakes manually himself independently of the driver's valve in the cab of the truck. In this way the mechanic under the truck or trailer can test the brakes and, after testing them, can release the operating fluid to release the brakes.

In some brake systems now in use the exhaust valve for exhausting the air to release the brakes is so constructed that it is possible for dirt or grit in the service line or brake applying line to cause a leak by getting under the exhaust valve seat. One of the objects of this invention is to provide a construction that will insure that the exhaust line can be fully opened when in use; also to provide a "dead end" service line operating so that if dirt or grit gets into this line, it can cause no obstruction of any valve, as there is no valve normally held open at the end of the service line.

Further objects and advantages of the invention will appear in the following part of the specification.

Referring to the drawings which are for illustrative purposes only,

Fig. 1 is a plan view, more or less diagrammatical in nature, illustrating the general arrangement of a brake apparatus embodying this invention applied to a vehicle and trailer.

Fig. 2 is a central section taken through a portion of this apparatus involved in the control of the application and release of the brakes and for charging the apparatus with the operating fluid under pressure. This view shows a portion of an auxiliary tank broken away and shows the duct or pipe connections to this part of the apparatus, also broken away.

Figure 3:
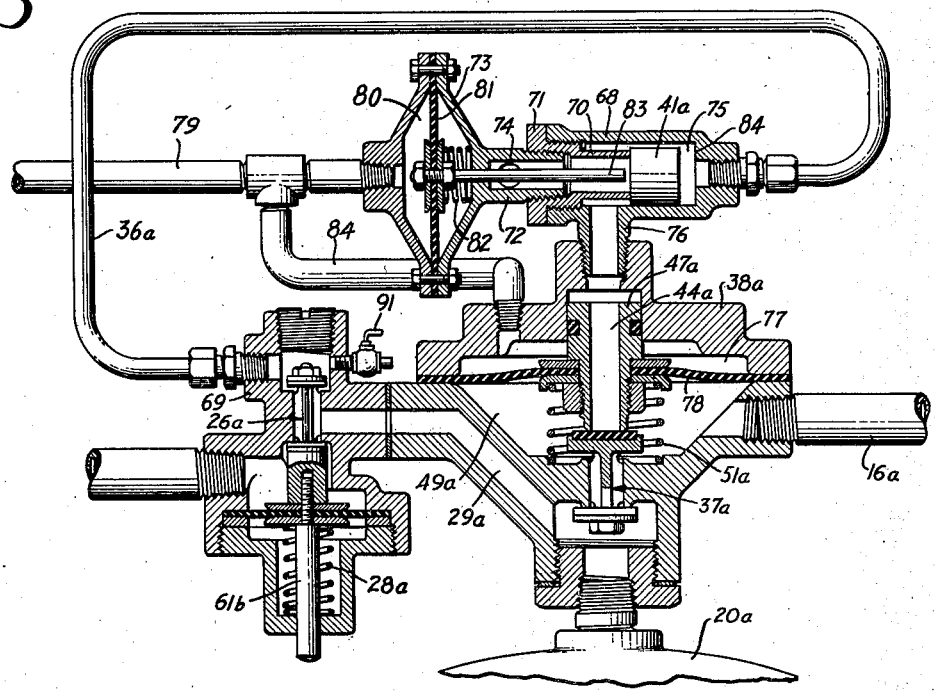
Fig. 3 is a view similar to Fig. 2, illustrating another embodiment of the invention embodying changes in details of the apparatus.

In Fig. 1 I have illustrated an apparatus embodying my invention, and in this figure, I indicates a main source of supply of operating fluid under pressure—in other words, a main reservoir carried by the vehicle and which is charged with the operating fluid through an inlet 2. The apparatus includes a pressure indicating gauge 3 located usually on the dash for observation by the driver of the vehicle, and this pressure gauge may be connected up on its pipe 3a that leads from the reservoir up to the driver's, or operator's, valve 5, which the driver uses in making a normal application of the brakes. This valve is operated either manually or by a foot pedal 6 connected by a link 7 to the valve 5 for admitting the operating fluid to a main supply line or service line 8 that carries the operating fluid to control mechanisms 9 and 10, located under the vehicle and under the trailer. The reservoir 1, if desired, may be provided with a relief valve 11 for safety.

Although I have not illustrated it, such brake apparatus usually includes an air compressor or pump on the motor that is automatically controlled by the pressure in the reservoir to maintain normal operating pressure in the operating fluid.

In case the apparatus is applied to a vehicle and trailer, as illustrated, the supply line, or service line, 8 includes a trailer supply pipe 8a that is connected by a flexible connection or hose 12 to the rear end of the supply line 8, and at the forward end of this flexible connection, a valve or cock 13 is provided for closing off the rear end of this supply line when the vehicle is being operated without any trailer.

The valve 5 is of a common type, and functions not only to admit the operating fluid to the supply line, or service line, 8, but also in its position of rest, connects up the pipe line to an exhaust outlet 14. In the present instance, as the apparatus is intended to operate with compressed air, this outlet 14 would exhaust into the atmosphere.

The service line 8 is connected by a lateral branch pipe 15 to the control mechanism 9 under the vehicle, and the control mechanism 10 under trailer is connected to the rear end of the pipe 8a for controlling it, for effecting normal application of the brakes from the driver's position. The control mechanisms 9 and 10 are connected by piping or ducts 16 and 17 respectively to brake chambers 18 on the vehicle and similar brake chambers 19 on the trailer. Only two brake chambers are illustrated for the trailer and the same for a vehicle, but it should be understood that this is merely a diagram; in practice where a plurality of wheel brakes are provided on a vehicle or truck and its trailer, each chamber would be connected up to be supplied with the operating fluid under the operating pressure.

An emergency reservoir for the operating fluid is maintained under the vehicle and under the trailer and, preferably, involves the use of a vehicle tank 20 and a similar tank 21 under the trailer. These tanks are connected up to their corresponding brake control mechanisms 9 and 10. These brake control mechanisms 9 and 10 are substantially identical in construction, and connected up in a similar manner to the main source of supply 1 of the operating fluid. In other words, an emergency line 22 conducts operating fluid back to a valve 23, similar to the valve 13, beyond which a flexible connection or hose 24 connects up to a rear supply line 22a which connects into the trailer control mechanism 10. A lateral branch pipe 25 leads off from the emergency line 22 and connects into the control mechanism 9 in a similar manner.

The control mechanism 9, which is similar to the mechanism 10, will now be described in detail, referring particularly to Fig. 2.

This mechanism includes a supply valve 26, having lower and upper closures 32 and 33, which functions when supplying the tank 20 with operating fluid, to effect also admission of the operating fluid to the brake chambers 18 and 19. It also functions as an emergency valve to effect an automatic full application of the brakes if the pressure in the supply line or in the tank 20 falls below normal operating pressure. This valve 26 is connected to a movable member or diaphragm 27 with which is associated resilient means such as a coil spring 28 for biasing the valve 26 toward a position which would close off flow through a duct 29 that leads over and communicates with the interior of the tank 20. This spring is of sufficient force to offer substantial resistance to the downward pressure of the diaphragm 27 when the operating fluid comes into the pressure chamber 30 which is located within the casing 31 of this valve, and under normal operating conditions, where the vehicle is running on a roadway, this diaphragm will be maintained pressed downwardly somewhat as indicated in Fig. 2, so that the heads or closures 32 and 33 of the valve 26 will be held respectively in opened and closed positions as shown.

When the pressure in the pipe 25 and the chamber 30 is at a sufficiently low value, or when the pressure therein is atmospheric, the spring 28 will hold the valve 26 in raised position so that the closure 32 will close off communication between the pipe 25 and the duct 29, and the closure 33 will be in raised position so that there will be open communication between the duct 29 and the bypass member 36 which has operative connection with the brake chambers 18, as will be hereinafter explained. When the air pump which charges the system through the inlet 2, Fig. 1, is started, there will be a build up of pressure in the emergency duct or piping 22 of the system. This pressure will be transmitted through the pipe 25 into the chamber 30, Fig. 2, and will build up therein as the charging of the tank 1 progresses, until the pressure against the diaphragm, predetermined by the strength and deflection or loading of the spring, overcomes the force of the spring and thereafter produces a gradual downward movement of the diaphragm 27 against the pressure of the spring 28, to move the valve 26 downward and thereby move the closure 32 into an open position and move the closure 33 toward closed position. The downward movement of the closure 32 will result in a flow of fluid pressure from the chamber 30 through the passage 29 into the tank 20 and through the bypass 36 to the brake chambers 18, so that during a prescribed part of the charging period there will be an automatic application of emergency pressure to the brake chambers independently of brake control exercised by operation of the valve 5. This flow of emergency pressure into the pipe 36 will continue until the pressure acting against the diaphragm 27 closes off the inlet to the pipe 36 by movement of the closure member 33 into fully closed position as shown in Fig. 2. Thereafter there will be a further build up in pressure in the main reservoir 1 and in the emergency reservoirs 20 and 21 without further increased pressure in the pipe 36.

The control mechanism 9 has a casing 38 which is mounted on the emergency reservoir 20. This casing 38 is chambered so that it may be divided by a diaphragm 50 into a lower chamber 49 and an upper chamber 60, the lower chamber 49 being connected through piping 16 with the brake chambers 18, and being connected through a valve passage 49' with a valve chamber 20' through which the passage 29 communicates with the reservoir 20. The upper part of the shell 38 has in alignment with the valve passage 39a bores 39 and 48 which are separated by valve seat 43. The upper end of the bore 39 communicates through a transverse passage 42 with an antechamber 53 to which the pipe 36 is directly connected. A shuttle valve 41 is slidable in the upper portion of the bore 39. This shuttle valve has lengthwise therethrough a passage 45 which is normally closed by a check valve 46, and at its lower end the shuttle valve 41 has an annular gasket or cushioned closure member 52 for engagement with the seat 43 when the shuttle valve 41 is forced downward by pressure applied to its upper end.

In the bore 48 a guide piston 47 is slidable, this guide piston being connected to the central portion of the diaphragm 50 and having a nipple 47a projecting downwardly at its lower end to engage a cushioned seat 52 carried at the upper end of the double check valve 37 which has limited sliding movement in the valve passage 49a. When the guide piston 47 and the diaphragm 50 are raised by the action of the spring 51, from the position shown in Fig. 2, the chamber 49 will communicate with the exterior atmospheric pressure through an axial passage 44 in the guide piston 47, through the seat 43 and through a port 40, which connects the lower part of the bore 39 with the exterior. In the upper wall of the antechamber 53 there is an exhaust port 54 normally closed by a valve member 55 which is connected to the outer end of a stem 56 which projects from a piston 57, a spring 57a being provided for urging the piston 57 inward so as to yieldably maintain the valve 55 in closed position. A passage 59 connects the chamber 60 with the lower portion of the antechamber 53, below the piston 57, and the service connection pipe 15 communicates with the lower part of the antechamber 53 below the piston 57, so that service pressure from the valve 5 may be directed into the chamber 60 to actuate the diaphragm 50 downward, and so that this service pressure may be also applied to the lower face of the piston 57 to open the valve 55.

With this organization, it is evident that when the brakes are applied in a normal brake application, the pressure developed in the chamber 60 will force the diaphragm down against the resistance of the spring 51, bring the lower end of the nipple 47a against the adjacent end of the double-check valve 37 and thereby force this valve open, which will permit operating fluid under pressure to flow from the tank 20 and from the duct 29 into the chamber 49, and thence through the brake piping 16 to the brakes 18. At the same time, the pressure adjacent the inner face of the piston 57 may be increased to such value as to move it outward against the force of the spring 57a and open the exhaust port 54, thereby letting the air out of the pipe 36 and also relieving any pressure which might exist and which is being exerted against the valved end of the movable member 41. After the application of the brakes through the service pipe 8 is discontinued and the valve 5 is released, the pressure in the line 8 and in the branch pipe 15 will become nil, and the release of the pressure in the chamber 60 will permit the spring 51 to push back the nipple 47a, thereby opening the passage 44 through it, to exhaust the operating fluid in the brake chambers. This operating fluid will then exhaust past the seat 43 and out through the exhaust outlet to the atmosphere.

Referring again to the supply valve 26, I prefer to construct this valve so that it can be operated by a brake tester under the vehicle or alongside of this brake apparatus, to apply the brakes. This is preferably accomplished by providing a stem 61 which projects out at one end from the bonnet 62 of this valve, so as to be within reach of the brake tester. The stem 61 has a threaded tip 61a that is threaded into the part 35, already described, to secure the valve 26 to the diaphragm 27. By pushing in on this stem 61, the brake tester can push the head 33 of this valve 26 off of its seat, which will permit the operating fluid to flow from the tank 20 past this valve and through the bypass 36, delivering this operating fluid through the port 42 and back of the movable member or shuttle 41 in the duct 39. The pressure on the back of this movable member will move it forward onto the seat 43 and deliver the operating fluid through the inner end of the nipple 47a and thence through the chamber 49 and the brake piping 16 to the brakes. After making a test application in this way, the brake tester can release the brakes by effecting exhaust of the operating fluid. This can be accomplished by opening up a small stop cock 63 which is attached at any convenient point, to let out air from the bypass and from the space back of the movable member 41. For convenience and for enabling the tester to accomplish this without moving from his position adjacent the stem 61, the valve or cock 63 is preferably located as indicated, but, if desired, the apparatus may be provided with another release valve 64 located in the wall of the casing immediately back of the movable member 41. The stem of this valve is guided through a plug 65 so as to project outwardly in a position to be pushed in when desired by the brake tester. This will lift the head 66 of this valve off its seat, overcoming the pressure of the coil spring 67 which normally holds this valve closed.

When charging the tanks 20 and 21, for example, when the vehicles are being made ready for a period of operation, fluid consisting preferably of air under pressure is delivered through the pipe connections 25 and 22a to the valve mechanisms 9 and 10. Referring to Fig. 2, this initial air pressure acts against the diaphragm 27 in a direction to compress the rear spring 28 and as soon as the pressure is sufficiently built up at this point, the valve 26 will move into a transitory intermediate position, with both its heads 32 and 33 off of their seats. The air pressure or fluid will then flow through the duct 29 to the tank 20. A part of the air pressure or fluid which passes the valve head 33 will flow through the bypass 36 and through the chamber 53 and the port 42 into the space in the bore 39 back of the shuttle valve 41. This will move the shuttle valve forwardly when the pressure is sufficiently built up and bring its inner end against the seat 43, and, after this occurs, the check valve 46 will open and permit the fluid to flow past it and through the passage in this member 41, and thence past the seat 43 and through the passage 44 in the movable member or piston 47. At this time the spring 51 is holding the diaphragm 50 in an elevated position so that the fluid passing down the passage 44, passes through the chamber 49 and thence through the brake piping 16 to the brake chambers 18. In this way the charging of the brake chambers and the tank 20 will continue until the valve 33 seats and stops the further build up of pressure in the brake chambers 18. Then, the charging operation will continue to build up the pressure in the tanks 1, 20 and 21 to a normal operating pressure higher than the pressure in the brake chambers, at which time the charging operation is automatically discontinued. Since the vehicle brakes are at this time applied by the pressure in the brake chambers, the vehicles cannot be moved. Therefore, before the vehicles can be operated, it is necessary to release the brakes, which can be done by opening the driver's valve, or operator's valve 5 to admit pressure into the lower end of the ante chamber 53 and against the inner face of the piston 57, to force the piston 57 against the pressure of the spring 57a, and move the valve 55 in open relation to the exhaust port 54, to bleed the pressure from the pipe 36, the upper part of the antechamber 53 and the passage 42. Fluid pressure against the lower end of the shuttle valve 41 may then move this shuttle valve upward so as to open the passage 44 of the guide piston 47 to the exterior through the port 40. When pressure is thus applied to the inner face of the piston 57, pressure will be applied in the chamber 60 to the upper face of the diaphragm 50, moving the diaphragm downward so as to cause the nipple 47a to engage the upper end of the double check valve 37 and move this double check valve 37 downward so that there will be a flow of fluid under pressure from the chamber 20' through the valve passage 49' and the chamber 49 to the brake chambers. When the operator's valve 5 is released, the pressure against the upper face of the diaphragm 50 will be immediately diminished so that the spring 51 will return the guide piston 47 and the nipple 47a into raised position, as shown in Fig. 2, spaced from the cushioned seat 52 at the upper end of the valve 37, whereupon fluid pressure from the brake chambers may bleed to the exterior through the chamber 49, the passage 44, the seat 43 and the port 40. The vehicles may be then operated and the brakes may be thereafter controlled through pressure applied through the service line 8 by actuation of the valve 5. The operating pressure transmitted through the service line 8 will be applied to the upper faces of the diaphragms 50 of the control mechanisms 9 and 10, moving the diaphragms 50 downward so as to open the valves 37 to apply the brakes and release of pressure from the service line 8 permits the diaphragms 50 to rise so that pressure from the brake chambers 18 and 19 will exhaust through the passages 44 of the valve devices. In event of a breakway of the trailer, the emergency brake operation will be automatically produced. The breakage of the flexible conduit 24 will result in a reduction in pressure in the pipes 22a and 25, relieving the pressure against the upper face of each diaphragm 27, Fig. 2, so as to permit the closure 33 to rise. This will permit passage of air from the emergency reservoir through the train of ducts initiated by the pipe 36 to the brake chambers. Should the driver of the vehicle start to drive away after a period of inoperation and at a time when there is no air in the system, the operation of the air compressor will first start to charge the main reservoir 1 and the pressure will be built up therein until the pressure in the supply or emergency piping 22 is sufficient to overcome the compression of the spring 28 and move the closure 32, Fig. 2, toward open position, whereupon air from the tank 1 will flow to the auxiliary reservoirs and to the brake chambers, so that there will be a relatively rapid application of the brakes, noticeable to the driver to such degree that he will become immediately aware of the fact that the system has not been charged, and may then delay driving until the system has become fully charged and he is able to release the brakes by a complete cycle of operation of the foot pedal 6, Fig. 1.

It will be recognized that when the charging operation of the compressor is first started, the closures 32 will be both in closed position so that the reservoirs 20 and 21 will be cut off from the air supply system, thereby reducing the volume of space into which the initially pumped air is to be received to the volume of the main tank 1. The result of this is that the pressure in the supply piping 22 will initially build up much more rapidly than if the reservoirs 20 and 21 were both initially connected into the system. Therefore, should the driver inadvertently drive off without first charging the system, he will have a larger supply of ari in the reservoir 1, with which to operate the brakes to proportionate extent, than he would have if all of the reservoirs 1, 20, and 21 were initially in open communication with the supply piping of the system.

In Fig. 3, I illustrate another embodiment of the invention which has substantially the same mode of operation as that illustrated in Fig. 2, except that instead of providing the movable member that corresponds to the member 41, with a passage through it controlled by a check valve, I provide a somewhat different construction for the parts that are associated with each other and cooperate to close off the exhaust to atmosphere, when desired; and to leave it open, when desired, and at the same time effect or complete a duct from the supply valve to effect an emergency application of the brakes, and also to cooperate during the charging operation to deliver the operating fluid under pressure to the brake chambers. Referring to Fig. 3, the movable member or shuttle valve 41a is not mounted in the casing 38a that houses the relay valve mechanism, but in the present instance, is mounted in its own casing 68, which is constructed as a fitting having a threaded nipple to screw into the upper end of the casing 38a.

A bypass pipe 36a is provided similar to the bypass pipe 36 and extends around from the casing 69 of the supply valve 26a, to deliver the fluid under pressure into the outer end of the casing 68 back of the shuttle valve 41a. This valve 41a is mounted to slide freely in the bore of the casing 68, and is mounted in such a way that the operating fluid can move past it. Any suitable means may be employed to effect this; for example, the diameter of the shuttle valve may be considerably smaller than the diameter of the bore, or the exterior of the shuttle valve may be provided with longitudinal grooves; or, if desired, the exterior of the shuttle valve may be provided with knurling which would permit the operating fluid to pass the valve.

In Fig. 3, the shuttle valve 41a is illustrated in the position which it has when an emergency application of the brakes is taking place. In this position the end of this valve seats against the end of a sleeve 70 that is formed as a part of a bushing 71 that is threaded into the left end of the casing 68, and in this bushing is mounted the threaded end of a nipple 72 forming a part of a pressure-controlled means 73, which is actuated by the pressure operating fluid in the normal application of the brakes. The nipple 72, near its junction with the pressure-controlled means 73, is provided with a lateral opening or exhaust outlet 74 from its bore to the atmosphere. In an emergency application of the brakes, the loss of pressure against the diaphragm of this valve, enables the spring 28a of the supply valve 26a to move the supply valve 26a to the position illustrated in Fig. 3, so that fluid under pressure will flow from the tank 20a through the duct 29a and thence past the valve 26a and the bypass 36a over into the chamber or space 75 at the right end of the casing 68 and back of the shuttle valve 41a. This moves the valve 41a over to the position in which it is indicated in Fig. 3 and this, of course, closes off the exhaust outlet 74 but permits the operating fluid in considerable quantities to move past the shuttle valve 41a and down through the nipple 76 that attaches the same to the upper side of the casing 38a, as viewed in Fig. 3. At this time there is no operating fluid under pressure in the chamber 77 to press against the diaphragm 78 and hence the movable member 47a will be held back by a coil spring 51a that corresponds to the spring 51, of Fig. 2; hence, the operating fluid coming down through the nipple 76 can pass through the passage 44a and will escape into the chamber 49a, from which point it will move through the pipe connection 16a to the brake chambers.

In a normal application of the brakes the driver's valve will be opened to permit the operating fluid under pressure to flow back through the service line 79, which delivers this fluid under pressure into the chamber 80 on the left side of the diaphragm 81 of the pressure-controlled device 73. This diaphragm is normally held in an extreme position toward the left by coil spring 82 within the casing, and this holds a stem 83 carried by this diaphragm, in a position withdrawn toward the left even further than the intermediate position in which this stem is illustrated in Fig. 3. When the pressure comes on in the pressure chamber 80 this stem 83 is thrust toward the right and its tip engages the end of the shuttle valve 41a, moving the valve over and seating it against a seat-face 84 at the right end of the casing 68, and this closes off a communication from the chamber 75 through the bypass 36a. At the same time that the fluid pressure is developed in the chamber 80, the fluid is also admitted through branch pipe 84 to the chamber 77 that forces the diaphragm 78 in a direction to carry the movable member 47a against the end of the double-check valve 37a, which will open this valve and permit operating fluid under pressure to flow from the tank 20a past the valve 37a and thence into the brake piping 16a. As soon as the driver releases the operating valve, the operating fluid in the service line 79 of the branch pipe 84 exhausts to atmosphere at that valve, and, when this occurs, of course the spring 51a pushes the diaphragm 58 and the member 47a away from the upper end of the relay valve 37a, thereby connecting up the brake piping 16a to the exhaust outlet through the passage 44a, nipple 76, and through the sleeve 70. As this operating fluid flows into the left end of the bore 69 it pushes the shuttle valve 41a over toward the right, if it is not already there, so as to permit this operating fluid to flow through the sleeve 70 at its right end, as viewed in Fig. 3.

Figure 4:
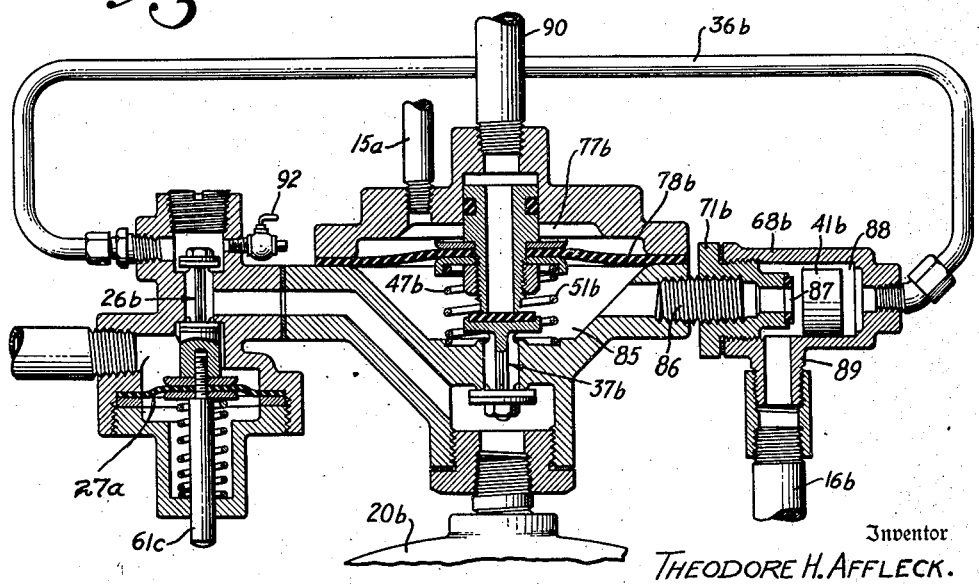
Fig. 4 is a view similar to Fig. 3, which illustrates another embodiment of the invention which is closely related in its construction and mode of operation to the apparatus illustrated in Fig. 2, but illustrating the construction which permits a simplification of the design of the main casing that houses a portion of the valve mechanism.

The embodiment illustrated in Fig. 4 is somewhat simpler than that illustrated in Fig. 3, but it also illustrates a construction avoiding the use of the check valve 46 employed in the construction illustrated in Fig. 2. In Fig. 4 the shuttle valve 41b is mounted in a casing 68b that is connected to the pressure chamber 85 through a bushing 71b and a nipple 86, and the bypass 36b is connected to the right end of the casing 68b as in the Fig. 3 construction. The brake piping 16b is connected into the side of the casing 68b. A seat 87 is provided on the end of the bushing 71b which may be in the form of a soft washer or gasket, against which the shuttle valve 41b fits when an emergency application of the brakes is taking place or when charging is taking place from the supply line. In either case the supply valve 26b will be open at its upper end as viewed in Fig. 4, which will permit operating fluid to flow into the bypass 36b and develop pressure in the chamber 88 at the right end of the casing 68b. This will close the passage through the bushing 71b and as this shuttle valve 41b is a loose fit or otherwise constructed to permit the operating fluid to pass it, the operating fluid will then flow down through the nipple 89 of this casing to which the pipe 16b is connected. This will deliver the operating fluid under pressure to the brake chambers to apply the brakes. In this embodiment of the apparatus, when a normal application of the brakes is being made, the operating fluid is admitted through a service pipe 15b to the chamber 77b that forces the diaphragm 78b in a direction to compress its coil spring 51b, thereby moving the nipple of the movable member 47b downward and causing its lower end to push the double-check valve 37b over to its open position. When this occurs of course operating fluid flows past this valve, from the tank 20b and thence through the chamber 85 and through the bushing 70b thereby forcing the shuttle valve 41b toward the right to close off the bypass 36b so that the operating fluid will pass down the nipple 89 to the brake piping 16b. Upon the release of the pressure in the service line, the operating fluid will flow back from the brake chambers through the nipple 89 and thence through the bushing 71b into the chamber 85; and from this point, by reason of the presence of spring 51b, the flow will be through the movable member 47b, and thence through an exhaust outlet 90 to the atmosphere.

In other respects the construction and mode of operation of the parts illustrated in Fig. 4 are substantially the same as that illustrated in Fig. 2, and both of these embodiments shown in Figs. 3 and 4 are constructed so that the stems 61b and 61c of their supply valves are accessible on the exterior of the casings of these valves to enable a brake tester under the truck or trailer to make a test application of the brakes independently of the operator's valve 5. In Fig. 4 the diaphragm 27a corresponding to diaphragm 27 of Fig. 2, is shown in the position it would have when there is no pressure in the fluid supply line leading into the pressure chamber above it.

And both of these embodiments, illustrated in Figs. 3 and 4, are provided with small valves 91 and 92, respectively, which the brake tester can open after he has applied the brakes, to release the operating fluid from the brakes.

It should be understood that the springs 51, 51a and 51b are all of sufficient force to prevent the pressure on the upper ends of the movable members 47, 47a and 47b from pushing these members down against their corresponding admission, application-and-release, or double-check valves 37, 37a and 37b. This insures that free flow for the operating fluid either in charging or in an emergency application of the brakes, will be established through the lower ends of the nipples, such as the nipple 47a, to enable the operating fluid to be delivered to the brake piping 16.

Many other embodiments of this invention may be resorted to without departing from the spirit of the invention.

I claim as my invention:

1. A fluid pressure operated brake system comprising a brake chamber for receiving fluid pressure to apply a brake, a main fluid pressure reservoir, an emergency fluid pressure reservoir, an emergency line leading from said main reservoir to said emergency reservoir, a passage leading from said emergency reservoir to said brake chamber having a pressure responsive valve therein which is opened in response to pressure supplied to said valve from said main reservoir through a service line and an operator's valve, a supply valve in said emergency line, fluid pressure bypass means leading from said supply valve to said passage between said pressure responsive valve and said brake chamber, said supply valve being operative on the existence of normal operating fluid pressure in said emergency line to prevent flow of fluid through said bypass means and said passage to said brake chamber and to permit fluid to pass to said emergency reservoir and, on the existence of less than normal operating pressure in said emergency line, to permit fluid to pass through said bypass means and said passage to said brake chamber to apply the brake; and a port in said bypass means having a valve responsive to the existence of fluid pressure in said service line to open said port to exhaust fluid from said bypass means.

2. A fluid pressure operated brake system for a vehicle comprising a brake chamber for receiving fluid pressure to apply the brake, a main fluid pressure reservoir, an emergency fluid pressure reservoir, an emergency line leading from said main reservoir to said emergency reservoir, a pressure responsive supply valve in said emergency line, fluid pressure bypass means leading from said supply valve to said brake chamber, said supply valve being operative on the existence of normal operating fluid pressure in said emergency line to prevent passage of fluid pressure through said bypass means to said brake chamber and to permit fluid pressure to pass to said emergency reservoir and, on the existence of less than normal operating pressure in said emergency line, to permit fluid pressure to pass through said bypass means to said brake chamber to apply the brake; and a stem secured to said supply valve for manually operating the supply valve independently of the pressure in said emergency line to permit fluid pressure to pass through said bypass means to said brake chamber to effect application of the brake.

3. A fluid pressure operated brake system as defined in claim 2 in which there is a manually operable valve in said bypass means for releasing fluid pressure from said bypass means and said brake chamber.

4. A fluid pressure operated brake system as defined by claim 2 in which there is an exhaust outlet to atmosphere in said bypass means, a seat in said bypass means, a shuttle valve in said bypass means movable against said seat to close said exhaust outlet upon flow of fluid from said supply valve through said bypass means.

5. A fluid pressure operated brake system for a vehicle comprising a brake chamber for receiving fluid pressure to apply the brake, a main fluid pressure reservoir, an emergency fluid pressure reservoir, an emergency line leading from said main reservoir to said emergency reservoir, a pressure responsive supply valve in said emergency line, fluid pressure bypass means leading from said supply valve to said brake chamber, said supply valve being operative, on the existence of normal operating fluid pressure in said emergency line to prevent passage of fluid pressure through said bypass means to said brake chamber and to permit fluid pressure to pass to said emergency reservoir and, on the existence of less than normal operating fluid pressure in said emergency line, to permit fluid pressure to pass through said bypass means to said brake chamber to apply the brake, an exhaust outlet to atmosphere in said bypass means, a seat in said bypass means, and a shuttle valve in said bypass means movable against said seat to close said exhaust outlet upon flow of fluid from said supply valve through said bypass means.

THEODORE H. AFFLECK.

REFERENCES CITED

The following references are of record in the file of this patent:

UNITED STATES PATENTS

| Number | Name | Date |
| --- | --- | --- |
| 1,765,634 | Stewart | June 24, 1930 |
| 2,018,212 | Johnson | Oct. 22, 1935 |
| 2,049,984 | Vorech et al. | Aug. 4, 1936 |
| 2,018,202 | Eaton et al. | Oct. 22, 1935 |
| 1,001,040 | Johnsonbaugh | Aug. 22, 1911 |
| 2,053,461 | Campbell | Sept. 8, 1936 |
| 2,289,559 | Turek | July 14, 1942 |
| 2,232,883 | Neveu | Feb. 25, 1941 |
| 2,135,007 | Kamenarovic | Nov. 1, 1938 |